(12) United States Patent
Kornbrekke et al.

(10) Patent No.: US 7,116,467 B2
(45) Date of Patent: Oct. 3, 2006

(54) STRUCTURED FLUID COMPOSITIONS FOR ELECTROPHORETICALLY FRUSTRATED TOTAL INTERNAL REFLECTION DISPLAYS

(75) Inventors: Ralph E. Kornbrekke, Chagrin Falls, OH (US); Saurabh S. Lawate, Concord, OH (US); Robert N. Jones, Mentor, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 11/247,710

(22) Filed: Oct. 11, 2005

(65) Prior Publication Data
US 2006/0056009 A1 Mar. 16, 2006

Related U.S. Application Data

(62) Division of application No. 10/764,070, filed on Jan. 23, 2004.

(51) Int. Cl.
*G02B 26/00* (2006.01)
*G09G 3/34* (2006.01)

(52) U.S. Cl. .................... 359/296; 345/107
(58) Field of Classification Search ............. 204/450; 252/583; 345/345; 359/296, 297; 430/32, 430/38
See application file for complete search history.

(56) References Cited

U.S. PATENT DOCUMENTS

| 4,094,911 A | 6/1978 | Mitsch et al. ............ 260/615 A |
| 4,523,039 A | 6/1985 | Lagow et al. ............... 268/615 |
| 4,724,092 A | 2/1988 | Fukui et al. .................... 252/54 |
| 4,894,494 A | 1/1990 | Rösl et al. ................. 200/11 R |
| 5,026,621 A | 6/1991 | Tsubuko et al. ............. 430/109 |

(Continued)

FOREIGN PATENT DOCUMENTS

EP 0594472 4/1994

(Continued)

OTHER PUBLICATIONS

"The Understanding and elimination of some suspension instabilities in an electrophoretic display", Journal of Applied Physics, Sep. 1978, pp. 4820-4829, Mūrau, P. and Singer, B., American Institute of Physics (Philips Laboratories, Briarcliff Manor, New York, published Apr. 10, 1978).

(Continued)

*Primary Examiner*—David N. Spector
(74) *Attorney, Agent, or Firm*—Teresan W. Gilbert; Michael F. Esposito

(57) ABSTRACT

A structured fluid composition comprising:
(a) a low refractive index liquid;
(b) particles including light absorbing charged particles such as pigments, non-light absorbing uncharged particles such as teflon, silica, alumina and combinations thereof; and
(c) at least one additive selected from the group consisting of a dispersant, a charging agent, a surfactant, a flocculating agent, a polymer, and combination thereof;
for use in a TIR electronic display.

The inventive composition improves the long-term stability, response time and visible appearance of image displays which electrophoretically frustrate total internal reflection (TIR).

17 Claims, 5 Drawing Sheets

Response of Individual Components and Blended Mixture

U.S. PATENT DOCUMENTS

| | | | | |
|---|---|---|---|---|
| 5,210,274 | A | 5/1993 | Huth | 560/26 |
| 5,283,148 | A | 2/1994 | Rao | 430/114 |
| 5,397,669 | A | 3/1995 | Rao | 430/108 |
| 5,530,053 | A | 6/1996 | Rao et al. | 524/462 |
| 5,573,711 | A | 11/1996 | Hou et al. | 252/572 |
| 5,604,070 | A | 2/1997 | Rao et al. | 430/110 |
| 5,681,881 | A | 10/1997 | Jing et al. | 524/368 |
| 5,733,526 | A | 3/1998 | Trevino et al. | 424/9.52 |
| 5,753,763 | A | 5/1998 | Rao et al. | 525/276 |
| 5,861,175 | A | 1/1999 | Walters et al. | 424/486 |
| 5,914,806 | A | 6/1999 | Gordon II et al. | 359/296 |
| 5,919,293 | A | 7/1999 | Moffatt et al. | 106/31.57 |
| 5,919,866 | A | 7/1999 | Rao et al. | 525/276 |
| 5,959,050 | A | 9/1999 | Mosbach et al. | 526/201 |
| 6,197,426 | B1 | 3/2001 | Coppens | 428/421 |
| 6,215,920 | B1 | 4/2001 | Whitehead et al. | 385/18 |
| 6,304,365 | B1 | 10/2001 | Whitehead | 359/296 |
| 6,384,979 | B1 | 5/2002 | Whitehead et al. | 359/619 |
| 6,437,921 | B1 | 8/2002 | Whitehead | 359/650 |
| 6,452,734 | B1 | 9/2002 | Whitehead et al. | 359/836 |
| 6,562,889 | B1 | 5/2003 | Rao | 524/366 |
| 2002/0180687 | A1 | 12/2002 | Webber et al. | 345/107 |
| 2003/0038755 | A1 | 2/2003 | Amundson et al. | 345/15 |

FOREIGN PATENT DOCUMENTS

| | | |
|---|---|---|
| EP | 0683436 | 11/1995 |
| JP | 62200335 | 9/1987 |
| WO | WO 96/31547 | 10/1996 |
| WO | WO 97/35904 | 10/1997 |
| WO | WO 99/67297 | 12/1999 |

OTHER PUBLICATIONS

"44.3L: A Printed and Rollable Bistable Electronic Display", Society for Information Display Symposium Proceedings, 1998, pp. 1131-1134, Drzaic, P., et al. (E. Ink Corp., Cambridge, MA, J. Jacobson, MIT Media Laboratory, Cambridge, MA).

"37.3: Development of Electrophoretic Display Using Microcapsulated Suspension", Society for Information Display Symposium Proceedings 1998, pp. 1014-1017, Nakamura, E., et al. (Engineer of Development Dept. NOK Corp.).

"Electrophoretic Display Technology", IEEE Transactions on Electron Devices, vol. Ed-24, No. 7, Jul. 1977, pp. 827-834 (Provided by Purdue University Technical Information Service 765-494-9876).

"New Method for Maintaining Long-Term Image Quality in a TIR-based Electrophoretic Display", Mossman, M.A. et al., Proceedings of the SID Eurodisplay 2002, Oct. 1, 2002, pp. 851-854, XP009048336.

"39.1: New Reflective Color Display Technique Based on Total Internal Reflection and Subtractive Color Filterint", Michele A. Mossman et al., SID Digest 2001, vol. XXXII, 2001, p. 1054, XP007007734.

"New Reflective Display Based on Total Internal Reflection in Prismatic Microstructures", Mossman, M.A. et al., Conference Record of the 20th International Display Research Conference, Palm Beach, FL, Sep. 25-28, 2000, International Display Research Conference (IDRC), San Jose, CA: SID, US, vol. CONF. 20, 2000, pp. 311-314, XP001032176.

"5.2: High Performance Electrophoretic Displays", Sally A. Swanson et al., SID Digest 2000, vol. XXXI, May 2000, p. 29, XP007007322.

STRUCTURED FLUID COMPOSITIONS FOR ELECTROPHORETICALLY FRUSTRATED TOTAL INTERNAL REFLECTION DISPLAYS

This is a divisional of copending application Ser. No. 10/764,070 filed on Jan. 23, 2004.

TECHNICAL FIELD

The inventive composition creates a structured fluid which improves the long-term stability, response time and visible appearance of image displays which electrophoretically frustrate total internal reflection (TIR).

BACKGROUND

In electrophoresis an ionically-charged particle moves through a medium due to the influence of an applied electric field. The concept of electrophoresis can be combined with the principles of 'Total Internal Reflectance' (TIR) to create addressable displays. A suspension of particles can be used to controllably frustrate TIR and switch the state of pixels in such displays in a cotrolled manner. For example, an electromagnetic field can be applied to move charged particles in the suspension through an electrophoretic medium toward or away from an evanescent wave region to frustrate TIR at selected pixel portions of the region. In order for the electronic display to be useful the display should have quick response times. Further it is desirable that there is good contrast between the dispersed particles and the white background and that the electrophoretically active suspension remains stable.

It is known that repeated switching of a display which utilizes electrophoretically-mobile particles can result in a non-uniform distribution or movement of the particles, gradually causing the formation of particle clusters which deteriorates the quality of images produced by the display over time. An example is found in Dalisa, A., "Electrophoretic Display Technology," IEEE Transactions on Electron Devices, Vol. 24, 827–834, 1977; and Mürau et al, "The understanding and elimination of some suspension instabilities in an electrophoretic display," J. Appl. Phys., Vol. 49, No. 9, September 1978, pp. 4820–4829. It has been shown that such undesirable clustering can be reduced by encapsulating groups of suspended particles in separate microfluidic regions. See for example Nakamura et al, "Development of Electrophoretic Display Using Microencapsulated Suspension," Society for Information Display Symposium Proceedings, 1014–1017, 1998 and Drzaic et al, "A Printed and Rollable Bistable Electronic Display," Society for Information Display Symposium Proceedings, 1131–1134, 1998.

In summary it is desirable for an electronic display to have long term stability, quick response time and high contrast between the background and image being displayed. The invention has discovered that certain compositions have a combination of physical properties which overcome these obstacles in particular on electrophoresis.

SUMMARY OF INVENTION

The inventive composition creates a structured fluid which improves the response time, visible image and long-term image stability of an electrophoretically-mobile particle display. The composition comprises 1) a low refractive index liquid, which is the electrophoretic medium 2) particles selected from the group consisting of light absorbing particles such as pigments which are charged, non-light absorbing uncharged particles which increase the viscosity such as, teflon, silica, alumina and the like and combinations thereof, 3) additives which include a) dispersants, b) charging agents, c) surfactants (also interchangeable with the term surface action agents), d) flocculating agents, e) polymers and f) and combinations thereof.

The composition is used to improve response time to form a display image after application of an electric field. The composition forms a structured suspension of particles in which the particles are stable from agglomeration. The particles interact through colloidal forces controlled by the composition which inhibits particle motion under low stress caused by gravity or by the osmotic flow of ions in an electric field induced by reversing the electric field as the display's pixels are switched between reflective and non-reflective states, without encapsulating the ink in isolated compartments.

DETAILED DESCRIPTION

Figure 1:
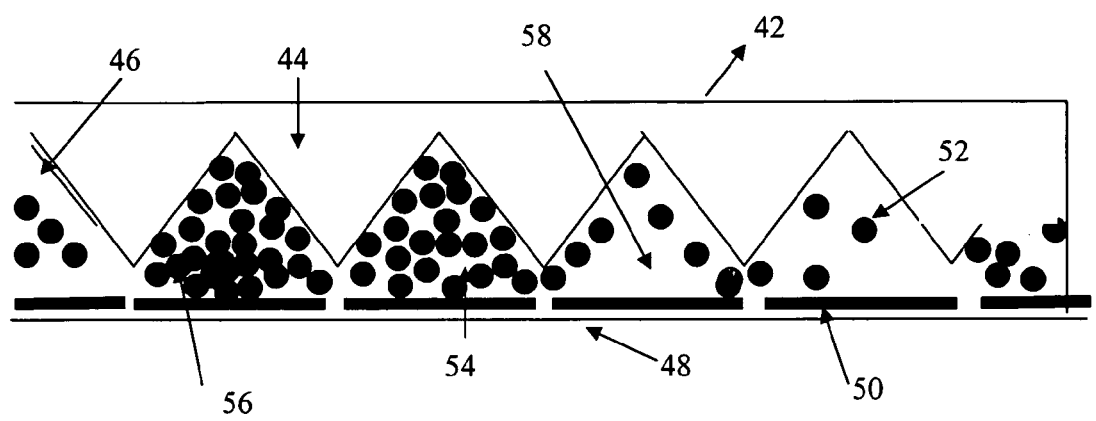
FIG. 1 is a fragmented, cross-sectional view, on a greatly enlarged scale, of a portion of a prior art electrophoretically frustrated TIR image display, depicting undesirable non-uniform particle distribution.

FIG. 1 shows dilute mixtures in unrestricted motion—historical prior art herein referred to as Case 1. FIG. 1 depicts a portion of a TIR image display which uses electrophoretic dispersions to create an image. The upper polymeric sheet 42 contains an array of reflective microprisms 44. The sheet can be constructed with prismatic geometry or my contain hemispherical high refractive index transparent hemi-beads, as described in U.S. patent application Ser. No. 10/086,349 filed 4 Mar. 2002 which is incorporated herein by reference. A thin, continuous, transparent electrode such as an indium tin oxide (ITO) coating 46 is applied to the inward surfaces of prisms 44. A segmented electrode 50 is applied to the inward surface of the bottom sheet, 48 to apply separate voltages (corresponding to individual pixels) between each adjacent pair of prisms 44. An electrophoresis medium—continuous liquid 58, for example, a low refractive index, low viscosity, electrically insulating liquid such as Fluorinert™ perfluorinated hydrocarbon liquid available from 3M, St. Paul, Minn. substantially fills the space between the sheets forming a TIR interface between the two sheets 42 & 48. This mixture also contains additives that interact with the particle surface to make it become ionically charged. This primary composition is a homogeneous dispersion of particles—suspension which will fill the liquid 58 uniformly, and the concentration of particles 52 is relatively low, in the order of 1% by weight. The particles 52 in this composition Case 1 are well dispersed; they randomly move by Brownian motion, and they will segregate from the liquid 58 under the influence of gravity. The particle separation is many times (in the order of ten times) greater than the particle size, so there are very few particles near the surfaces of the reflective micro-prisms 44.

A voltage source (not shown) is electrically connected between the electrodes on the prism surface 46 and the bottom segmented electrodes 48 to controllably apply a voltage across selected pixel regions of liquid medium 58. Application of a voltage across a selected pixel region electrophoretically moves particles 52 (pigments) suspended within the selected region to form a layer that begins within about 0.25 micron of the evanescent wave zone adjacent the inward surfaces of the selected region's prisms and extends about 5 microns into the region. When electrophoretically moved as described, particles in the suspension 54, which have a higher refractive index than the surrounding liquid 58 and are much smaller than a wavelength of light and therefore substantially non-light-scattering, cause the layer to have an effective refractive index that is substantially higher than that of the surrounding liquid 58. This absorptive particle layer causes absorption of the light as it passes through the upper sheet. This gives the selected pixel region a dark appearance to an observer who looks at outer surface of the microprism upper sheet 42. This process is slow (compared to Case 3-type compositions) because a number of particles 52 must move a relatively long distance to produce this optical effect. Application of an opposite polarity voltage across the selected pixel region electrophoretically moves the suspended particles 54 toward that lower segmented electrode 50. As a result the particles 52 are out of the evanescent wave zone and the light which passes through the microprisms 44 undergoes TIR so the region has a white appearance to an observer who looks at the sheet's outer surface.

Additional details of the construction of these displays and optical characteristics of electrophoretically-frustrated TIR image displays can be found in U.S. Pat. Nos. 6,064,784; 6,215,920; 6,304,365; 6,384,979; 6,437,921; and 6,452,734 all of which are incorporated herein by reference; and, in the aforementioned U.S. patent application Ser. No. 10/086,349.

The bottom electrode can be segmented to provide electrode segments 50, as shown in FIG. 1. A controller (not shown) can then be used to selectively apply a voltage to each pair of electrodes in the segmented electrode array. Each electrode segment 50 (or group of adjacent electrode segments) corresponds to an individually controllable pixel.

Dispersed particles in the suspension 54 will tend to agglomerate or stick together as they move near one another because of van der Waals attractive forces. The dispersants are added to the mixture to inhibit agglomeration, and they do this by forming a barrier from electrostatic or osmotic pressure forces. However, the dispersion 54 is inherently unstable. These lyophobic colloidal dispersions require a great deal of mixing energy when being made. They are thermodynamically unstable, but the dispersant barrier helps to inhibit the ultimate breakdown that is agglomeration, size growth and separation of the two phases. When these dispersions 54 are put in an electric field which moves the particles 52 they will collide with tremendous force and this will tend to enhance agglomeration. These dispersants as commonly used to stabilize suspensions, that is provide a barrier to inhibit agglomeration when particles collide with thermal energy, but they will not provide a large enough barrier to prevent agglomeration with the collision force induced by an electric field. Also, as the field is reversed consecutively, electric field gradients will cause the charged particles and ions to migrate between adjacent cells. As a result, particles 52 in these Case 1 compositions will tend to accumulate or cluster 56 in regions, and they will not readily diffuse back to fill space uniformly. The particles in these Case 1 compositions will also tend to segregate from gravity driven motion due to differences in density between the particles and liquid. This will also tend to result in regions with high higher and lower particle concentration. The motion of particles 52 in an electric field gradient and the clustering 56 will also tend to enhance agglomeration. The particles 52 in these Case 1 compositions will rotate in the field gradient, and as they are packed into clusters particles 56 will tend to arrange so that the part of the particle with least repulsive forces are closest. The particle surfactant coating may well be non-uniform and the charge distribution may be non-uniform—hence, the particle motion and clustering will tend to enhance contact between the parts of the particle that are most likely to have strong attraction; so they will agglomerate. These phenomena are illustrated in FIG. 1. Electrophoretically-frustrated display can exhibit undesirable clustering of particles 56 in the suspension 54 over time. More particularly, particles 52 tend to form loose agglomerates, surrounded by regions of the electrophoretic medium 58 containing relatively few suspended particles 52. Such clustering often results in long-term deterioration of the display's image quality and overall performance.

Figure 2:
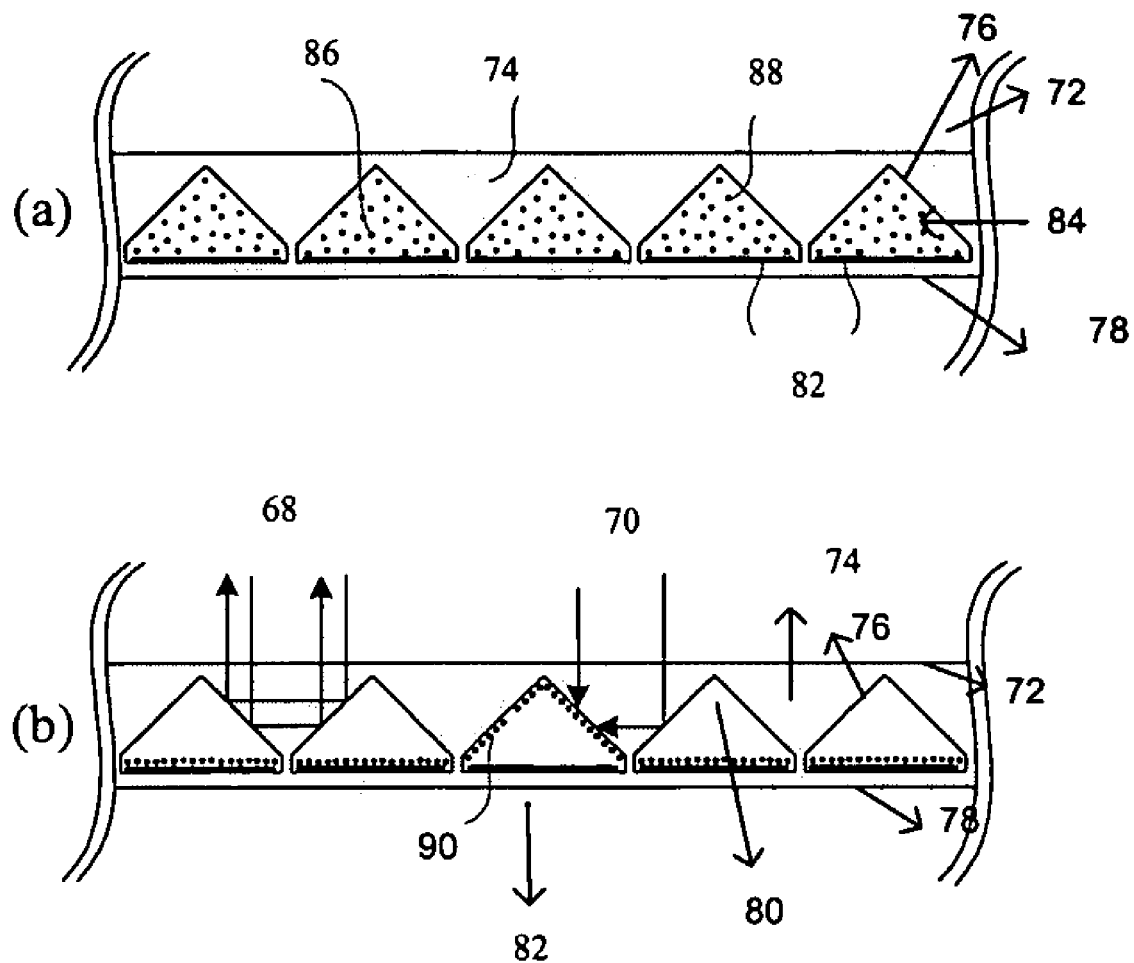
FIG. 2A is a fragmented, cross-sectional view, on a greatly enlarged scale, of a portion of a prior art electrophoretically frustrated TIR image display, before application of an electric field.
FIG. 2B depicts the FIG. 2A display after selective application of an electric field.

FIGS. 2A and 2B show dilute mixtures in confined compartments—prior art to minimize cluster formation herein referred to as Case 2. FIGS. 2A and 2B depict a prior art technique for reducing undesirable particle clustering with an ink composition. This composition is similar to that in Case 1 composition in an electrophoretically-frustrated display having a transparent upper 'microprism' sheet 72 and a lower substrate sheet 78. The upper sheet 72 contains an array of parallel reflective microstructred prisms 74. The tip of the microprisms 74 are connected to the lower sheet 78 as illustrated. This forms an encapsulated channel 88 between opposed facets of each adjacent pair of prisms. The encapsulated channels 88 will prevent particle migration between adjacent cells, and it can also inhibit particle sedimentation, and this will reduce formation of particle clusters. Each channel is filled with an electrophoresis liquid medium 80, forming a TIR interface between the upper microprism sheet 72 and the continuous liquid medium 80. This continuous liquid medium 80 contains a finely dispersed suspension 86 of pigment particles 84. A thin transparent electrode such as ITO 76 is applied to the inward surface of the upper microprism sheet 72. A segmented electrode 82 is applied to the inward surface of the lower sheet 78, to create separate pixel regions corresponding to each channel (or a group of adjacent channels 88).

A voltage source (not shown) is electrically connected between the electrodes on the prism surface upper ITO coated electrode 76 and the bottom sheet segmented electrodes 82 to controllably apply a voltage across selected pixel regions of liquid medium 80. Application of a voltage across a selected pixel region electrophoretically moves pigment particles 84 suspended within the selected region to form a layer that begins within about 0.25 micron of the evanescent wave zone adjacent the inward surfaces of the selected region's prisms and extends about 5 microns into the region. When electrophoretically moved as described, particles in the suspension 86, which have a higher refractive index than the surrounding fluid 80 and are much smaller than a wavelength of light and therefore substantially non-light-scattering, cause the layer to have an effective refractive index that is substantially higher than that of the surrounding liquid 80. This absorptive particle layer 90 causes absorption of the light ray 70 as it passes through the upper sheet 72. This gives the selected pixel region a dark appearance to an observer who looks at outer surface of the upper 'microprism' sheet 70. This process is slow (compared to Case 3—type compositions) because a number of pigment particles 84 must move a relatively long distance to produce this optical effect. Application of an opposite polarity voltage across the selected pixel region electrophoretically moves the suspension of pigment particles 86 toward that lower segmented electrode 82. As a result the pigment particles 84 are out of the evanescent wave zone and the light which passes through the microprisms 74 undergoes TIR 68 so the region has a white appearance to an observer who looks at the sheets outer surface.

In Case 2, although encapsulation of the ink into compartments keeps the suspension of particles 86 within separate channels 88 and reduces undesirable clustering, it may in some cases be impractical to fabricate, fill or maintain channels 88. In Case 2 the encapsulation may not completely eliminate particle clustering and agglomeration in the ink because they can segregate within a cell, and the strong electric field will still increase the force of particle collisions.

The inventive composition herein, Case 3, provides a suspension 110 with structure to minimize cluster formation, and improve contrast and speed. The composition of the invention creates a stable dispersion with a colloidal structure where the light absorbing particles 100 are charged. The composition comprises 1) a low refractive index liquid 104 which is the electrophoretic medium; 2) particles 100 including light absorbing particles such as pigments which are charged and low light absorbing uncharged particles which increase the viscosity and provide part of the interactive or structured network, such as, teflon, silica, alumina and the like; and 3) additives which include a) dispersants, b) charging agents, c) surfactants, d) flocculating agents, e) polymers and f) and combination thereof.

The composition also provides for good contrast of a dark image in a white background, and a rapid response time to form the image after application of the electric field. The composition may be a mixture of particles which form a very dark color, preferably black. It is preferable to have a dark image against a light such as white background. The concentration and nature of components in the composition are adjusted to form a structured fluid where the particles interact with each other and the other components so they will not readily flow under a low stress, but will move rapidly in an electric field to form an image.

The composition contains a low refractive index liquid which include fluorinated liquids, Fluorinert perfluorinated hydrocarbon liquid manufactured by 3M, St. Paul, Minn., Krytox Oil, a perfluoropolyether manufactured by DuPont performance Lubricants, Wilmington, Del. and the like. The low refractive index liquid may be used in combinations thereof. The low refractive index has a low dielectric constant in the range of about 1 to about 20, preferably about 1 to about 10 and more preferably about 1 to about 5. The low dielectric constant reduces the overall conductivity of the composition. The low reactive index liquid includes polar, non-polar and mixtures thereof, preferably the low reactive index liquid is non-polar. The liquid is in the composition in the range of about 10 wt. % to about 95 wt. %, preferably about 30 wt. % to about 60 wt. % of the composition. The low refractive index liquid has a molecular weight in the range of about 100 to about 5,000, preferably about 200 to about 5000 and more preferably about 500 to about 1000 and a viscosity in the range of about 1 centipoise to about 100 centipoise preferably about 1 centipoise to about 10 centipoise. The refractive index difference between the polymer transparent front sheet of the display and liquid is as large as possible, at least about 0.15 and preferably at least 0.30. The volatility of the liquid should be as low as possible while maintaining a low viscosity. The chemical structures of exemplary liquids are shown below. Paritally fluorinated fluids can also be used.

Structure of Krytox Oil is as follows:
Krytox Oil TFL 8896, Polyhexafluoropropylene oxide

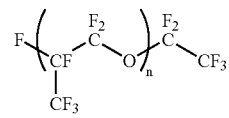

n = distribution of 10 to 30 (approximately)

1,1,1,2,2,3,3-Heptafluoro-3-pentafluoroethyloxy-propane for n=1

The Structure of Fluorinert Oil is as follows:
Fluorinert FC-75, perfluorinated fluid

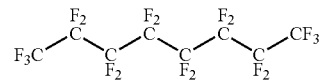

1,1,1,2,2,3,3,4,4,5,5,6,6,7,7,8,8,8-Octadecafluoro-octane

It is preferable that the liquid has as a low refractive index as possible (per fluorinated liquids have the lowest refractive index). The composition contains additives which are soluble in the liquid and which stabilize the suspended particles (prevent agglomeration) and cause the particles to become charged so they are electrophoretically active.

The composition contains particles which include light absorbing particles, very low light absorbing particles and/or non-light absorbing particles which increase the viscosity of the overall composition and provide part of structural network, and mixtures thereof. In one embodiment of the invention the particles in the composition are preferably light absorbing particles. In another embodiment of the invention the particles in the composition are preferably light absorbing particles and non-light absorbing particles. The light absorbing particles include pigments, metals, mixtures thereof and the like; they are finely dispersed in the liquid electrophoretic medium, and they are charged. The non-light absorbing particles are finely dispersed in the liquid, and they include organic polymers such as teflon, polystyrene, nylon, polycarbonate and the like and inorganic compounds such as silica, alumina, calcium carbonate, clays (kaolin, bentonite, montmorillonite, etc.) and the like and combinations thereof, and these particles are added to help create a structured colloidal dispersion. However, they are not charged in the composition because they do not contribute to the optical effects. These particles may be spheroidal, polyhedral or have a high aspect ratio like needles or rods which can enhance the structure of the mixture. The uncharged particles are in the composition in the range of about 0 wt. % to about 60 wt. % and preferably about 2 wt. % to about 20 wt. % of the composition.

Pigments are colored particles which may be organic or inorganic in nature. Pigments can be broadly classified into colored and white pigments. White pigments are inorganic while colored pigments can be organic or inorganic. The pigments include quinacridones which are red or copper colored, pthalocyanines which are blue, or carbon black, iron oxide or aniline black which are black and combinations thereof. Strongly colored pigments are preferable since they offer high contrast with the background. A composition containing equal weight mixtures of a quinacridone and pthalocyanine pigment produce a very dark color which is especially suitable for many displays. The pigment particles can be a mixture of more than one and are in the ratio in the range of 50 wt. % to about 50 wt. %, in one embodiment about 30 wt. % to about 70 wt. %, and in another embodiment about 20 wt. % to about 80 wt. %. For the purpose of using pigments in outdoor display applications it is desirable that they possess general characteristics as follows.

| Property | Desired |
| --- | --- |
| Color | Dark |
| Light Fastness | High |
| Ease of Dispesion | High |
| Presence of metal ion | Acceptable |
| Particle size | <300 microns, and preferably <450 microns. |

The color and light fastness depends on the structure of the pigment, and the pigments with the above properties are desired. The surface chemistry of the pigment controls its dispersion, and particle size.

The particle may contain amine functionality, nitrogen containing molecules that impart bascity, acidic functional groups and the like. The particle may contain combinations of functionality. Exemplary amine functionality are shown in the structures below, the quinacridone and pthalocyanine pigments.

The quinacridone pigment, NRT-796D-Monastral Red-B is represented by the structure as follows

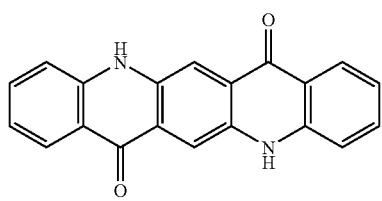

5,12-dihydroquino[2,3-b]acridine-7,14-dione

The pthalocyanine pigment, Cromophtal Blue A3R is represented by the structure as follows:

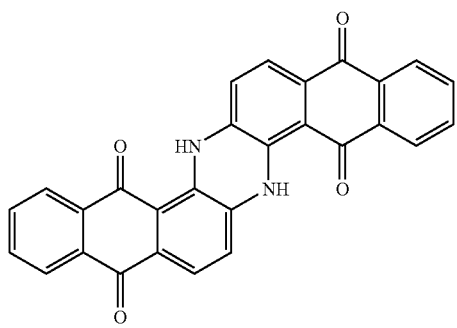

6,15-Dihydro-dinaphtho[2,3-a;2',3'-h]phenazine-5,9,14,18-tetraone

Examples of pigment particles with exemplary nitrogen containing segments in the structure imparting a degree of basicity to the pigment surface include aniline black and the like. Carbon black has acidic groups on its surface, including carboxylic acid and phenolic groups, and other commercial pigments have acidic functional groups. The surface chemical functional groups are the sites for interaction with the other components in the composition. Pigments are further modified by surface treatments. These surface treatments in turn impart additional functional groups for interactions with other components in the composition.

The particle concentration in the composition is adjusted to obtain a particle separation which promotes particle/particle interactions (long range), and generally this results in an ordered arrangement of particles, that is a colloidal structured fluid. The particles are in the composition in the range of about 1 wt. % to about 75 wt. %, preferably about 10 wt. % to about 60 wt. % of the composition. The interactions include coulombic interactions, steric interactions, osmotic pressure interactions and the like induced from absorbed or attached surfactants, depletion force interactions from polymers dissolved in the liquid, and attractive forces between particles in a weakly flocculated state. These interactions are facilitated by other components in the composition and these components also assist in preventing particle agglomeration. The particle spacing (needed for desired particle-particle interactions) depends upon the concentration of other components which interact collectively to produce the interactive forces. The desired spacing depends upon the balance of forces which restrict motion and inhibit segregation of particles with the ability to move quickly in response to an electric field resulting in fast response time.

The composition may contain two or more sets of particles with different particle size distributions to improve the structure by enabling a more efficient packing arrangement. This enables a higher loading of particles and smaller separation distances between particles, and then stronger interactions between particles. The viscosity is higher, and the structuring of the fluid is enhanced. This helps reduce particle migration, decreases segregation of particles and decreases the tendency of particles to form clusters. The higher particle loading also improves the dark color density when the dispersion is in the evanescent wave zone near the surface of the display, and this improves the image quality.

The composition includes dispersants which are soluble in the liquid. The dispersants include Krytox™ 157-FSL, Krytox™ 157-FSM or Krytox™ 157-FSH fluorinated oil (respectively having specified molecular weights of approximately 2500, 3500–4000 and 7000–7500, CAS Registry No. 860164-51-4, DuPont Performance Lubricants, Wilmington, Del. 19880–0023); they are shown below, and Zonyl fluorosurfactants, or Forafac fluorinated surfactants, DuPont Chemical Company, 1007 Market street, Wilmington, Del. 19898. Combinations of dispersants may be used.

The dispersant concentration in the composition depends upon the concentration of pigment particles, and on the other components in the mixture. The weight ratio of dispersant to pigment in the composition is in the range of about 0.1 to about 3.0, and preferably about 1.0 to about 2.0. The dispersant in the composition is in the range of about 0.001 wt. % to about 70 wt. %, preferably about 2 wt. % to about 40 wt. % of the composition.

The Krytox 157—FSH, Perfluroalkylpolyethercarboxylicacid (Mw 5000–7000) is represented as follows:

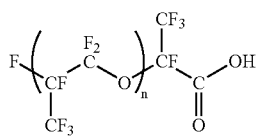

n = 10 to 60

2,3,3,3-Tetrafluoro-2-heptafluoropropyloxy-propionic acid where n=1 Krytox™ 157-FSL (lower average molecular weight of above FSH, Mw 3500)

The dispersant interacts with the surface of the particle to form a strong bond which anchors it to the surface, and the tail of the surfactant is highly soluble so it creates a barrier (generally through osmotic pressure) to prevent agglomeration with other particles. More than one dispersant can be used. The dispersant depends on the surface chemistry of the particle; the selection is made to optimize the interactions. For example, a dispersant with an acid functional group, like carboxylic acid, might be chosen for a particle containing basic functionality, like the quinacridone or pthalocyanine pigments, to obtain strong interactions. Likewise, a dispersant with a basic amine functional group, might be chosen for carbon black. At least one of the dispersants interacts by acid-base interactions to produce an ion pair (salt) with the surface of the light absorbing particle.

In one embodiment, the particle surfaces are almost completely to completely covered with dispersant. Some of the dispersant needs to dissociate from the surface so the light absorbing particle is charged. Preferably the surface of the particle and dispersant should form pairs which saturate the surface, but upon saturation also enable a small degree of dissociation. This can be facilitated by allowing close packing with some steric constraint upon saturation. The charged particles will have electrostatic interactions as they move near each other. This will provide a barrier which inhibits agglomeration, and in conjunction with steric (osmotic pressure) interactions it will make a very stable suspension where the particles will not agglomerate.

The degree of charging can be adjusted by varying the dispersant in the composition of the dispersion. The degree of dissociation will depend on the combination of solubility in the liquid, the strength of acid-base interaction, the molecular shape of dispersant and the molecular structure of the particle surface. Charging is also improved when the dissociated dispersants form micelles which help minimize the recombination of the ions, and this results is a higher degree of overall dissociation. In liquids with a low dielectric constant the double layer around charged particles (distance from the particle surface to charge neutrality) tends to be very large. This is because there are a very small number of ions in the liquid. As the particle spacing is decreased the charged particles will interact with each other, and this will create a suspension with a highly ordered structure. The spacing needed for the interaction will depend upon the magnitude of particle charge and the number of excess ions in solution, and these are controlled by the concentration and characteristics of the components used. Higher charging and lower concentrations of excess ions increase the strength of the interactions. The particles in this suspension interact with all nearest neighbors and this interaction inhibits their movement under low shear.

In one embodiment, dispersants with either acidic or basic functional groups chosen to interact with the complementary basic or acidic functional groups on the surface of the light absorbing particle are used. This results in a composition containing charged light absorbing particles and only the counter ions for those charged groups, hence no excess ions. As a result the conductivity of the mixture is very low; this improves the structure and performance of the composition. It is preferable that the conductivity of the composition is low so the electrical power requirements of the device is minimized.

In another embodiment, the dispersant contains functional groups on opposite ends of the backbone of the molecule. This enables it to become tethered to two different particles, and this prevents particle migration. The functional groups are chosen so they have strong interactions with the functional groups on the surfaces of the particles. The length of the molecule is chosen to allow some flexibility in movement, and in particular to allow the particle spacing to become compressed when the dispersion is placed in an electric field. The molecule also is long enough, and contains bulky enough and highly soluble branches along its backbone, ranging from methyl to dendritic structures which entrain the liquid and prevent particle agglomeration by osmotic pressure. In fluorinated liquids a fluorinated backbone is more soluble, so it is preferred in this embodiment. The concentration of this bi-functional dispersant is kept low enough so some functional groups on the surface of the light absorbing particles are available for interactions with mono-functional dispersants. These mono-functional dispersants contain acidic or basic functional groups which form salt pairs with the complementary acidic or basic functional groups on the light absorbing particle surfaces, and when they dissociate, the particle becomes charged. This composition of bi-functional and mono-functional dispersants combined with particles and liquid form an interlocked network. The particles will not form agglomerates or clusters nor will they migrate, and the network can expand or contract when placed in an electric field.

In another embodiment, the particles in the composition are loosely flocculated, and they form a network. The ordered arrangement of particles depends on the size and packing of the particles. Flocculation occurs when the particle separation is less than the distance of van der Waals attractive forces which depends on the particle size and physical characteristics of the particle. These particles are still dispersed well enough to prevent tight agglomeration. This is accomplished by using a low molecular weight dispersant which covers the particle surface thoroughly. This dispersant is soluble in the liquid and has a short tail, in the range of about 4 to about 20 carbon atoms in length, and contains functional groups similar to those described previously, such as amines or carboxylic acid, and the like, which bond strongly onto the functional groups on the particle surfaces. Fluorinated dispersant molecules would be more soluble, and are preferred for fluorinated liquids. The composition may contain combinations of such dispersants. The flocculating agents are in the composition in the range of about 0% to the range of about 0.001 wt. % to about 70 wt. %, preferably about 2 wt. % to about 40 wt. % of the composition.

The dispersants are chosen so all particles are well dispersed, but only the light absorbing particles are charged.

If the particles are well dispersed, and the available space (in the liquid) is occupied by dissolved non-adsorbing polymer or other uncharged dispersed particles as previously described this can also create a suspension with a highly ordered structure. A polymer which is highly soluble in the liquid can cause the particles to form a highly ordered structured from attractive depletion forces and the effectiveness will depend on the relative size of the polymer radius of gyration and particle size combined with the concentration of each. This type of interaction can result is ordering with particle volume fractions as low as a few volume percent. At high concentrations non-adsorbing polymers in solution can stabilize particle suspensions (prevent agglomeration), and this can also result in an ordered structure at higher particle concentrations.

The polymers include highly soluble forms of polyethylene, polypropylene, polyisobutylene, polystyrene or the like which do not adsorb onto the particles in the composition (no functional groups to interact with the functional groups on the particle surfaces), and they have a high molecular weight such that the radius of gyration is close to the radius of the light absorbing particles in the composition; these may be co-polymers or homo-polymers with branching to increase the entrainment of solvent—for fluorinated liquids partly or completely fluorinated polymers would be more soluble—in this embodiment it is preferred. The polymers would be in the molecular weight range from about one thousand Dalton (Da).to about one million Da., preferably about ten thousand Da. to about a few hundred thousand Da. The polymers may be used in combination. The polymer is in the composition in the range of about 0.1 wt. % to about 70 wt. %, preferably about 1 wt. % to about 20 wt. % of the composition.

The composition may also include rheology control agents. These are soluble polymer molecules which become swollen by the liquid, and this causes an increase in the viscosity of the liquid; this decreases the mobility of particles. This helps prevent particle segregation and enhances the structure of the fluid. The swelling of the polymer will vary inversely with temperature, and this counterbalances the change in viscosity of the liquid with temperature. This helps maintain constant fluid flow properties with temperature changes, and this results in more consistent response time with variation of temperature. The rheology control agents include ethylene plus propylene copolymers, styrene plus butadiene copolymers, polymethacrylates, polyisobutenes and the like. Combinations may be used. The rheology agents are soluble in the liquid; fluorinated polymers would be more soluble in fluorinated liquids so it would be preferred in that embodiment. The polymers have molecular weights in the range from about 10,000 Da to about one million Da. The rheology control agents are in the composition in the range of about 0% (not present) to the range of about 0.01 wt. % to about 25 wt. %, preferably about 0.5 wt. % to about 15 wt. % of the composition.

The composition may also include surface active agents (surfactants) which have a different function than the dispersants. These surfactants act as charging agents by forming salt pairs with larger molecules, like dispersants, in the composition, or they facilitate charging by forming micelles possibly in conjunction with other components in the composition. They increase particle charging by improving the dissociation of salt pairs by mediating the charge on the ion or associating with the ion to decrease the tendency to recombine with the counter-ion. They may also act as co-dispersants and occupy sites on the particle surface to help improve the total surface coverage. The surfactants include soluble small molecules with short tails and some polar groups, such as hydroxyl, substituted aromatics, carboxylic, amine, amide, as well as salts and aromatic groups and the like. The surfactants may be used in combination. The surfactants are in the composition in the range of about 0 wt. % to about 25 wt. % and in another embodiment in the range of about 0.01 wt. % to about 20 wt. % of the composition.

In another embodiment, the composition is used to create a suspension which remains unagglomerated (no cluster formation) under conditions of operation without forming a structured fluid. In this case, the colloidal suspension is stabilized by having a tightly packed dispersant (surfactant) layer which is very strongly bound to the particle surface. This dispersant also has a high molecular weight tail that is very soluble in the liquid, and this inhibits agglomeration under severe conditions without forming a structured fluid. These suspensions will become structured at higher particle loadings, but the response time is too slow or optical properties are inadequate because particle motion is too severely limited. For example, when very high concentrations of dispersant (surfactant) are used, a highly structured dispersant (surfactant) layer can form on the surface of the solid. This tightly packed layer can include several dispersants, chosen to maximize coverage and strength of bonding to the surface of the particle. The light absorbing particles are charged in this composition because some of the dispersant which formed salt pairs on the particle surfaces has become dissociated, leaving a net charge.

Overall the total amount of all the additives in the composition are in the range of about 0.1 wt. % to about 60 wt. %, preferably about 1 wt. % to about 40 wt. % and more preferably about 5 wt. % o about 30 wt. % of the composition.

The colloidal dispersion of the composition has a structure which inhibits the particle migration from the low stress associated with gravitational segregation or caused by field gradients associated with reversing the electric field. This structure also inhibits aggregation of particles caused by strong collisions driven by a high electric field. The structured array of particles will become compressed and pushed away from one electrode and toward the other one when the field is applied. However, the forces associated with the structure will inhibit the compression of particles, and the higher particle concentration results in shorter distance traveled, therefore lower velocities will be reached, and there will be a reduction in agglomeration caused by the electric field.

Figure 3:
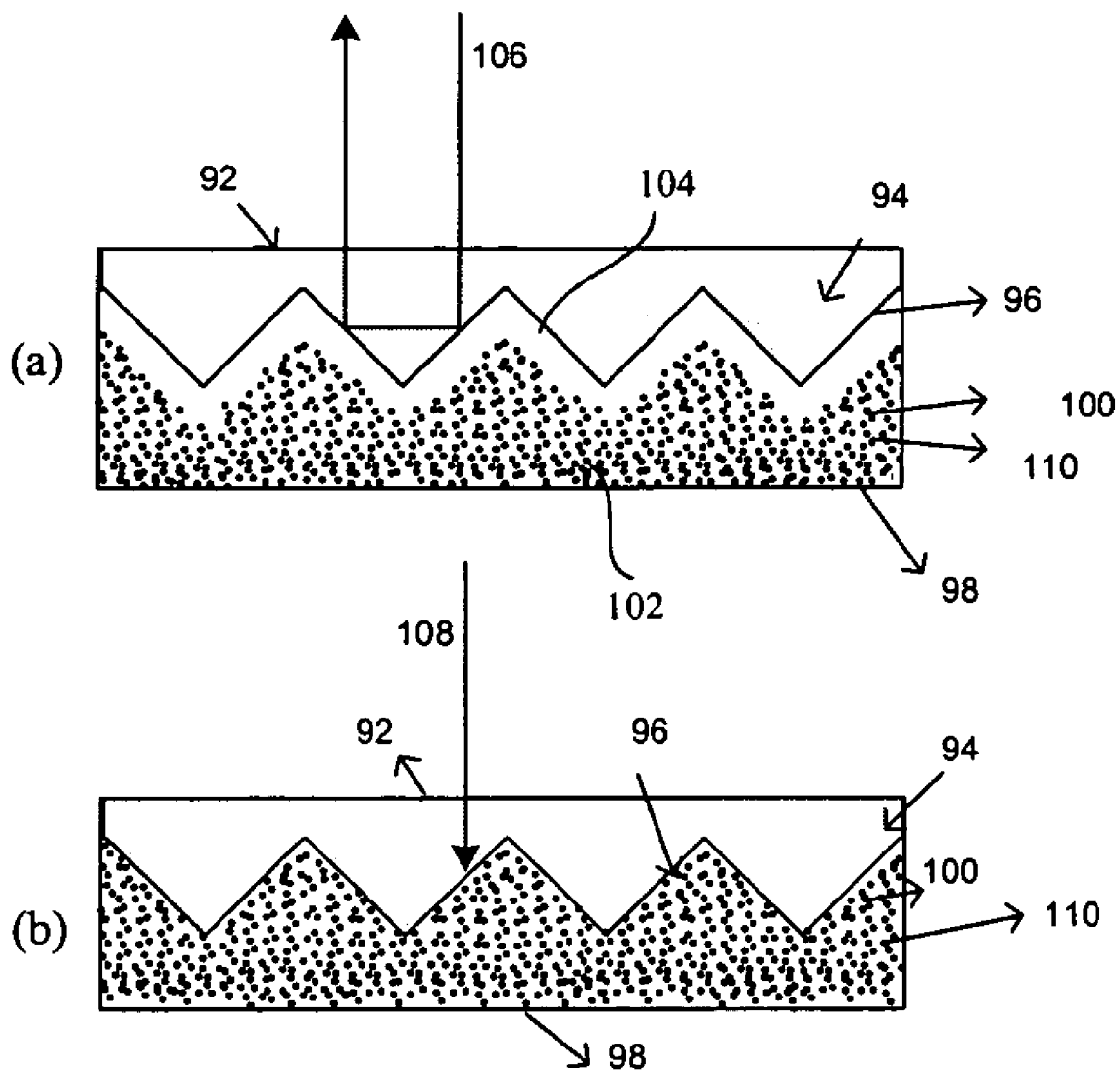
FIG. 3B is a fragmented, cross-sectional view, on a greatly enlarged scale, of a portion of one pixel of an electrophoretically frustrated TIR image display in accordance with the invention, before application of an electric field.
FIG. 3A depicts the FIG. 3B display after selective application of an electric field.

The structure will inhibit particle motion, but this is balanced by the optical properties required of the device. The composition contains particles that are spaced more closely together, and this increases particles interactions. It will also result in particles being near the prismatic surface. This is illustrated by FIG. 3B which shows a structured suspension 110 which has a uniform dispersion of particles 100 closely spaced. For example, for particles 100 with a diameter of about 150 nm the spacing will range from about 300 nm at a volume fraction of about 0.1 to about 130 nm for a volume fraction of about 0.25 and about 40 nm for a volume fraction of about 0.5. As the volume fraction increases the spacing becomes smaller than the particle diameter and the particles 100 will be well within about 0.25 micron of the evanescent wave zone adjacent the inward surfaces, of the prisms 94. As a result the particles 100 will absorb the incident light 108 causing a refractive index mismatch which frustrates TIR, giving the depicted pixel region a dark appearance to an observer who looks at sheet's 92 outer surface.

When the electric field is applied, the structured suspension 110 of the composition becomes compressed 102 and moves away from the electrode surface 96; this is illustrated in FIG. 3A. For example, when a voltage source, not shown, is electrically connected between the upper and lower electrodes 96 and 98 to controllably apply a voltage across the uniform suspension 110, the spacing between particles 100 becomes reduced as the particles, in the uniform suspension 110, are squeezed away from the electrode 96 surface. This leaves a liquid film of low refractive index fluid 104 between the inward surface of upper sheet 92 and the compressed suspension 102, and it is sufficiently thick approximately 0.25 microns that it enables substantially all of the evanescent wave to be confined to a particle-free region of fluid and thus cause TIR 106, such that light which passes through the upper sheet 92 is reflected by TIR 106 at the interface, giving a white appearance to an observer who looks at sheet's 92 outward surface. It only requires a small displacement of the particles 100 in the composition to create a 0.25 micron thick film of liquid 104. When as depicted in FIG. 3b, the field is reversed, the particles 100 are pulled into the evanescent region and they frustrate the TIR 108 causing the depicted pixel region a dark appearance to an observer who looks at the outer surface of the sheet 92.

The movement of particles into and out of the evanescent wave zone must be very rapid so that the transition of pixel color from white to dark happens very fast. The structure of the dispersion composition must be adequately strong to prevent migration under low stress; it must inhibit strong collisions under a high electric field, but it cannot reduce the speed of particle motion into and out of the evanescent zone near the electrode.

The particle charge which helps create the ordered structure of the dispersion also causes electrophoretic motion of the particles. As the particle charge increases the electrophoretic velocity into and out of the evanescent zone will increase. These two effects—columbic interactions which promote a rigid structure and electrophoretic particle motion are linked together. The composition which promotes an ordered structure, including charging and close particle spacing also promotes the fast response to the electric field. The close particle spacing enables the change in color with minimal movement of particles, and the particle charging enables electrophoresis which becomes faster as the charge increases.

Specific Embodiment

The following examples demonstrate the composition and advantages of the present invention.

The composition will control the structure, and the structure can be measured using rheology. Rheology is the measurement of the flow properties of a fluid. When a stress is applied to a fluid it will flow, and the measurement of shear stress with rate of shear will show the characteristics of that fluid. In particular, the rheology of a dispersion will show how the particles move in the liquid. The stress can be applied as an oscillation or as a continuous stress, and these measurements show different aspects about the structure.

The composition of the mixture can be adjusted to modify its colloidal structure and obtain a suspension which does not form agglomerates or clusters, but still has a rapid response to the application of a low electric field; this dispersion has a specific type of rheology which helps to characterize its structure. This is illustrated in the following examples.

Three mixtures R, S and V containing pigments, liquid and surfactant were made as described below.

Formulation 1

Mixture R:
    25.0w % Pigment
        12.5% w NRT-796D-Monastral Red-B
        12.5% w Cromophtal Blue A3R
    25.0% w Krytox™ 157-FSH
    50.0% w Krytox™ Oil Mixture S:
    43.0 w % Pigment
        21.5% w NRT-796D-Monastral Red-B
        21.5% w Cromophtal Blue A3R
    14.0% w Krytox™ 157-FSH
    43.0% w Krytox™ Oil Mixture V:
    34.0% w Pigment
        17.0% w NRT-796D-Monastral Red-B
        17.0% w Cromophtal Blue A3R
    19.5% w Krytox™ 157-FSH
    46.5% w Krytox™ Oil Mixture V was made by mixing equal portions of R and S. These mixtures were each evaluated using a device with a design illustrated in FIG. 3A, and constructed with 25 μm prisms separated from a conductive substrate such that the average gap thickness was 75 μm. The mixtures were introduced into the gap between the microstructured surface and the rear substrate and the reflectance of light from the surface was measured when the device was subjected to a 1 Hz, 50 volt electrical pulse. The results of this measurement for the 3 mixtures are shown in FIG. 4.

Figure 4:
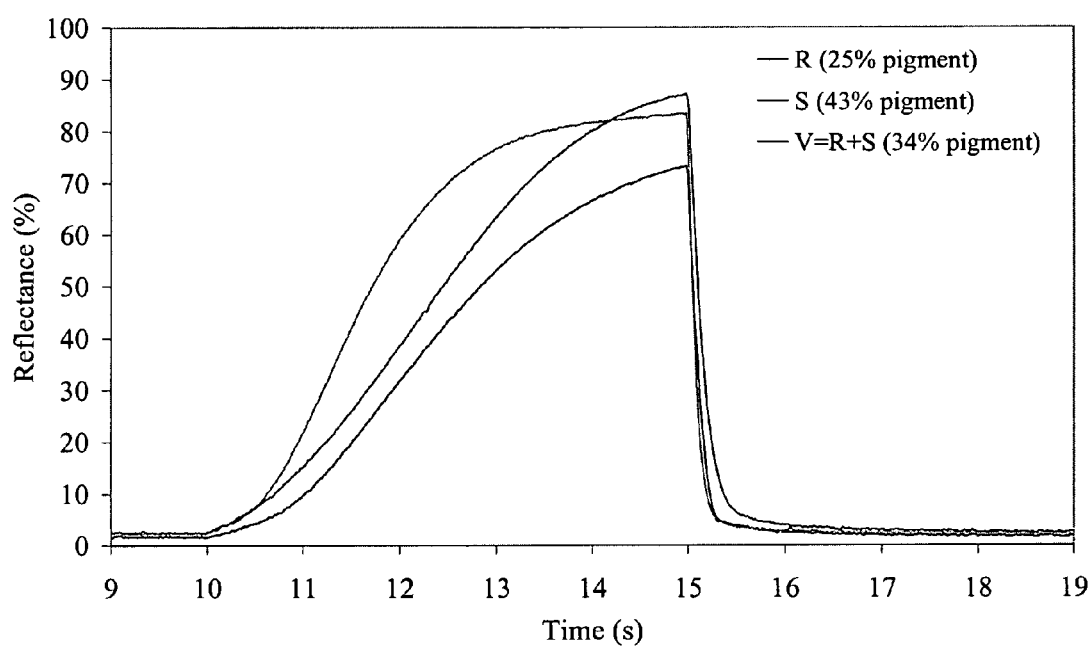

The graph in FIG. 4 shows that mixture S which has the highest pigment loading has the slowest response to the field. Mixture R which has the lowest pigment loading is faster than S, but mixture V has the fastest response. This is unexpected; one might expect that the response or speed of mixture V would be between S and R—since it is a mixture of the two. Further, on inspection of the components in the mixtures, mixture V has a higher concentration of components that would tend to increase the viscosity of the fluid. Hence one might expect that it should have a slower response, but it is faster.

Figure 5:
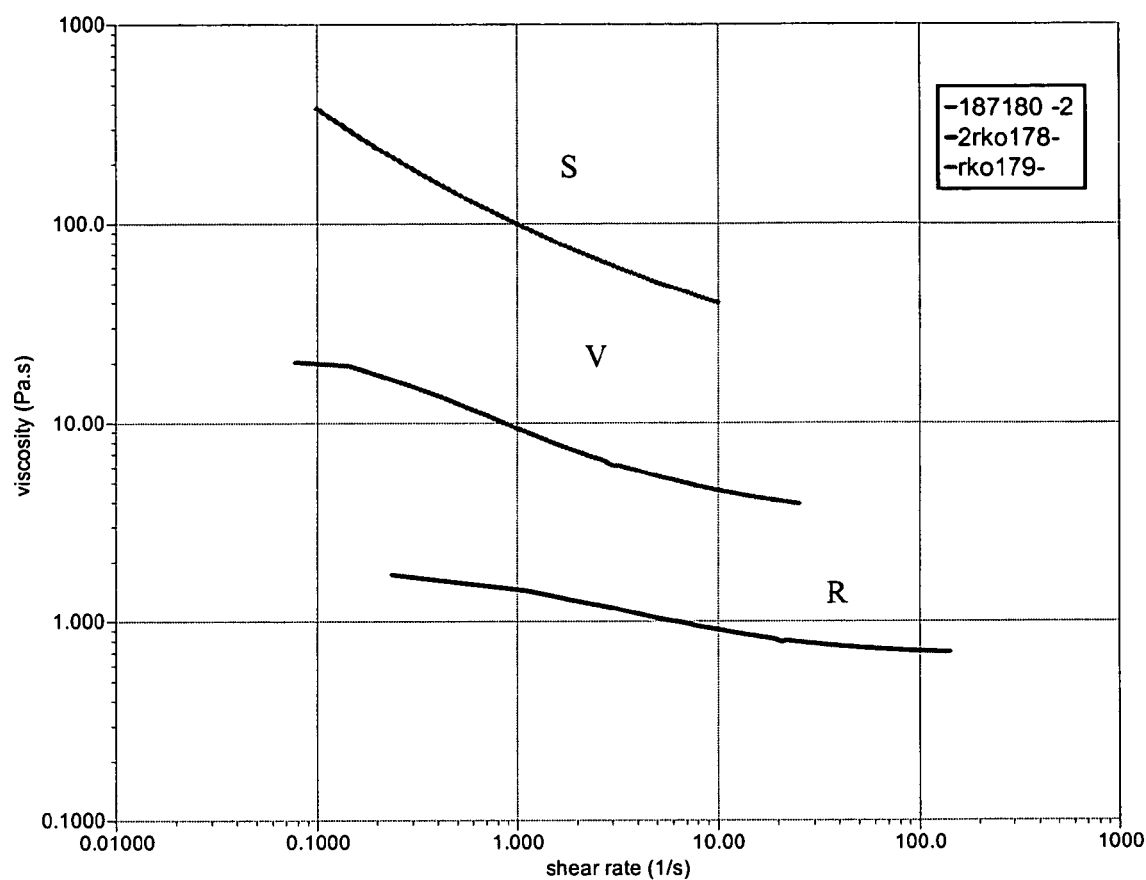

This result was investigated further from rheology measurements. A Carrimed CSL controlled stress rheometer was used for these measurements. A cone and plate configuration was used, and the measurements were done at 25° C. The results of these measurements are shown in the plot in FIG. 5:

The upper curve in FIG. 5—rko179 is sample S; the middle curve, 187180-2 is sample V, and the bottom curve, rko-178 is sample R. The viscosity varies with shear rate in all cases, so these mixtures are non-Newtonian, and this indicates that the particle systems have some structure, or that the particles are interacting with each other. The higher viscosity and greater change with shear rate indicates that there is a greater degree of structure. Another way of interpreting this data is to fit it to a model which has parameters that relate to physical characteristics of the suspension. This data was fitted to two conventional models, the Herschel-Buckley model and the Cross model; the fitted parameters are shown in the Table I below:

TABLE I

| | Cross model | | H_B model | |
|---|---|---|---|---|
| sample | zero shear Pa-s | Infinite shear, Pa-s | Yield stress, Pa | Rate index |
| V | 27.73 | 3.394 | 3.131 | .8653 |
| R | 1.874 | .6769 | 1.291 | .9683 |
| S | 4.81E05 | 24.43 | 24.71 | .7026 |

The zero shear and infinite shear parameters represent the initial, unperturbed viscosity and viscosity of the continuous liquid phase respectively; the yield stress represents how much force is required to initiate movement—break a structure, and the rate index indicates how close to Newtonian (totally unstructured) the mixture is. Hence the sample with the highest concentration of pigment, sample S, has the strongest structure, and the sample with lowest pigment loading, sample R, has the weakest structure.

This suggests that the intermediate level of structure is needed for the fastest response or movement of pigments in an electric field. A structure which is too strong impedes motion and this is what one might expect. However, the mixture with a weaker structure responds more slowly, and this is contrary to expectations. Perhaps the particles in the intermediate structured fluid can move in tandem and hence faster than those in the less structured fluid which may not be able to move in tandem because the structure is too weak. It's also possible that this is due to a combination of factors such as particle charge, inter-particle interactions and ratio of forces—which squeeze the liquid to push it out when the structured colloid is compressed.

The structure must also inhibit particle motion under weaker, but long term stresses, such as gravity and diffusion induced by field gradients. Hence the mixture must be adjusted to reach the right combination, including particle spacing, particle charging, colloidal stability and liquid viscosity—in combination with the ability to move quickly in a strong field while remaining immobile in low shear.

As will be apparent to those skilled in the art in light of the foregoing disclosure, many alterations and modifications are possible in the practice of this invention without departing from the spirit or scope thereof. The scope of the invention is to be construed in accordance with the substance defined by the following claims.

What is claimed is:

1. An electronically addressable display, comprising:
   (a) a transparent upper front sheet;
   (b) a lower sheet that is essentially parallel to and spaced from the upper front sheet;
   (c) a structured electrophoretic suspension substantially filling the space between the sheets which structure is controlled by the composition of the suspension, wherein the composition comprises a low refractive index liquid; a light absorbing particles; particles which are not light absorbing; and at least one additive selected from the group consisting of a dispersant, a charging agent, a surfactant, a flocculating agent, a polymer, and combination thereof; and
   (d) a means for applying a voltage across the suspension for controllably compressing the suspension away from the inward surface of the front sheet to either form a thin particle free liquid layer to allow total internal reflection or a layer with a higher concentration of particles to frustrate total internal reflection at the inward surface of light rays passing through the front sheet.

2. The display of claim 1 wherein the composition is a structured fluid composition comprising:
   (a) a low refractive index liquid;
   (b) particles selected from the group consisting of light absorbing particles; non-light absorbing particles or very low light-absorbing, particles wherein the non-light absorbing particles help to create a structured colloidal suspension; and wherein the particles interact through colloidal forces without encapsulating the fluid in isolated compartments; and
   (c) at least one additive selected from the group consisting of
      (i) a dispersant,
      (ii) a charging agent,
      (iii) a surfactant,
      (iv) a flocculating agent,
      (v) a polymer, and
      (vi) combination thereof;
   wherein the particle has a sufficient number of functional groups of either acid or base, to allow the dispersant to form a tightly packed mono-layer, and wherein the dispersant has the complementary acid or basic function group to interact with the particle surface and a molecular structure resulting in a strong interaction between the particle surface and the dispersant to inhibit agglomeration,
   resulting in a stable suspension that is not agglomerated, having ionically charged light absorbing particles, and forming an interactive structure which inhibits motion therein, wherein the liquid electrophoretic medium is comprised of substantially fluorinated oils.

3. The display of claim 2 wherein the liquid electrophoretic medium is comprised of substantially fluorinated oils.

4. The display of claim 2 wherein the particles of the composition occupy from about 1 to about 75% by weight of the electrophoretic suspension.

5. The display of claim 2 wherein the particles of the composition comprise a blue pigment, red pigment, brown pigment, black pigment and combinations thereof.

6. The display of claim 5 comprising a mixture of two or more pigment particles to enhance the optical properties, wherein the frustration of total internal reflection is improved by the collective absorption of different wavelengths of light.

7. The display of claim 2 wherein the composition results in a colloidal structure with a non-Newtonian rheology.

8. The display of claim 2 wherein the composition results in a colloidal structure which has a yield stress.

9. The display of claim 2 wherein the particles of the composition have a surface treatment selected from the group consisting of reaction with an oxidizing or reducing chemical, reaction with a chemical that covalently bonds to the surface, grafting onto the surface with a plasma containing small molecules with various functional groups or mixtures thereof resulting in improved response time and as herein the dispersant forms a tightly packed monolayer adsorbed on the particle surface resulting in less particle agglomeration.

10. The display of claim 2
    (a) wherein the particles of the composition have a sufficient number of functional groups of either acid or base, to allow a dispersant to form a tightly packed mono-layer, and (b) wherein the dispersant has the complementary acid or basic functional group to interact with the particle surface and a molecular structure resulting in a strong interaction between the particle surface and the dispersant to inhibit agglomeration.

11. The display of claim 2 wherein the particles of the composition are suspended and have at least two distinct particle size distributions one in the range of about 200 nm to about 500 nm and the other in the range of about 10 nm to about 100 nm.

12. The display of claim 2 wherein the dispersant has only an acidic functional group or a basic functional group.

13. The display of claim 2 wherein the ratio of dispersant to pigment ranges from about 0.1 to about 3.

14. The display in claim 2 wherein the concentration of pigment particles is adjusted to maintain small particle separation distance in a homogeneous dispersion so the distance that particles must move to produce a color change in TIR is small, in a fast response time in producing an image.

15. The display of claim 2 where the pigment concentration is high enough to enable rapid color change in an electric field.

16. The display in claim 2 wherein the charging agent, dispersant or surfactant forms inverse micelles which increase the particle charge thereby improving the structure and response time of the mixture.

17. The display of claim 2 wherein the light absorbing particles are pigment and the non light absorbing particles comprise teflon, silica, alumina or mixtures thereof.

* * * * *